Jan. 22, 1924.

W. HEGEL 1,481,365

DRINKING DEVICE FOR POULTRY

Filed March 9, 1921

Inventor
William Hegel
By his Attorney
Fetherstonhaugh & Co.

Patented Jan. 22, 1924.

1,481,365

UNITED STATES PATENT OFFICE.

WILLIAM HEGEL, OF ROBBINSVILLE, NEW JERSEY.

DRINKING DEVICE FOR POULTRY.

Application filed March 9, 1921. Serial No. 450,931.

*To all whom it may concern:*

Be it known that I, WILLIAM HEGEL, a citizen of the United States, and residing in Robbinsville, in the county of Mercer and State of New Jersey, have invented certain new and useful Improvements in Drinking Devices for Poultry, of which the following is a clear and exact description, reference being had to the accompanying drawings, forming part of the specification.

This invention relates to devices adapted to furnish drinking water to poultry.

It has for an object to provide such a device that clean, fresh water is constantly available for the flock.

It has for a further object to provide a structure such that the water on the surface is constantly agitated so as to prevent freezing of the water in the trough.

It has for a further object to provide a device whereby during the drinking, the water picked up by the comb, gills and feathers of the poultry is prevented from being scattered about to make germ breeding messes, particularly in the poultry houses.

Other objects will appear as the description proceeds.

Figure 1:
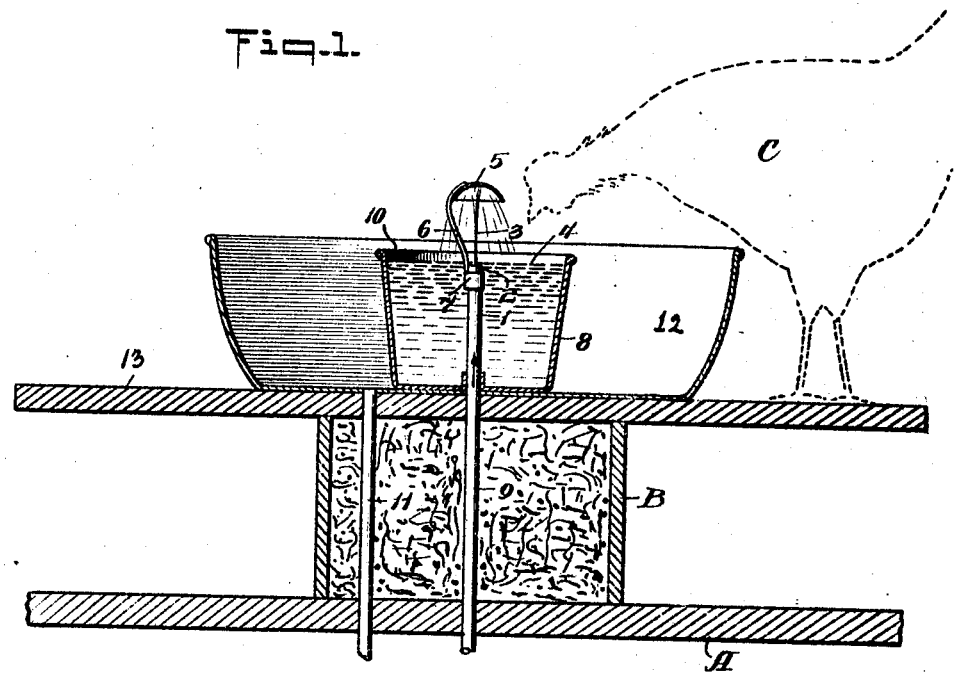

Reference is made to the drawings for a description of a preferred embodiment of the invention in which Figure 1 is a vertical section through the center of the device showing in outline, a fowl about to drink from the fountain.

Figure 2:
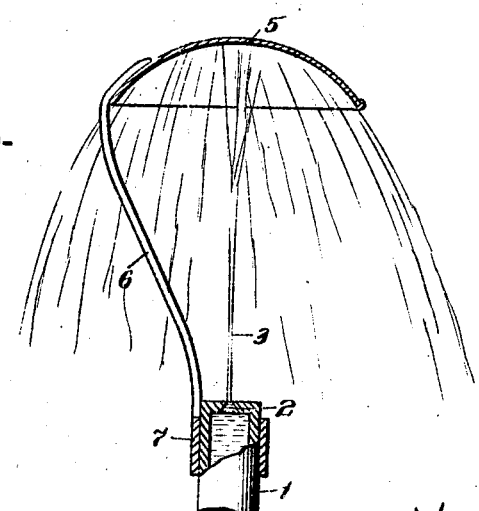

Figure 2 is a vertical section similar to that of Figure 1 on an enlarged scale showing how the water is sprayed by being reflected from the canopy.

Referring to the drawings in Figure 1, A represents the floor of a poultry house. This floor may be of sand, cement or timber in which the pipe 9 is connected with a suitable supply of water under pressure. On the floor A there is placed a box B which is filled with suitable material such as straw or saw dust which prevents the entry of cold air to the water pipe 9. On top of the box B there is a platform 13. In Figure 1 in dotted lines a fowl C is shown standing on this platform.

The water, under presure, flows up through the pipe 9 which terminates in a spout 1 provided with a nozzle 2 having a small aperture therein adapted to project upwardly a jet 3. The nozzle 2 is placed slightly below the normal level 4 of the water of the drinking trough 8 so that the upward flow of the jet 3 tends to make a constant commotion in the water of the trough 8 at all times. The jet 3 rises upward until it is intercepted by an umbrella-like canopy 5 which is supported on a bracket 6 which is attached to a collar 7 adapted to fit about the spout 1 below the normal level 4 of the water in the drinking trough.

The spray formed by the reflection back of the jet 3 from the canopy 5 is scattered about over the surface 4 of the water in the trough. This tends to make a constant commotion on the surface and prevents the freezing of the water as well as tending to make the water fresher and more palatable by aeration. The rim 10 is so positioned that water overflows when it has risen in the trough to cover the nozzle 2. The drain pipe 11 connected with the pan 12 is passed down through the box B and may be positioned in a small cesspool beneath the poultry house.

It is clear from the foregoing that a drinking trough is provided which tends to make a constant commotion of the water in the trough so that freezing of the water is prevented. It is apparent also that the water is aerated and freshened for drinking purposes, and that any scum or washings from the heads of the poultry which may be deposited on the surface of the drinking water are carried off constantly because of the constant flow of water over the edge of the trough. These features tend to provide fresh clean drinking water at all times for the poultry and prevent the spreading of disease among the flock because, as in the case of community drinking among human beings, the germs are similarly communicated among the poultry with deadly effect in many cases.

In Figure 1 a fowl is shown standing on the platform 13 and reaching over in order to drink. While drinking the fowl intermittently raises its head and often shakes its head. It is clear that during this operation water would be scattered about a poultry house and this scattering of water would tend to make muddy spots or messes for the spread of disease germs and to further soil the poultry house. In order to prevent the scattering of this water about the poultry house there is provided an ordinary pan 12 with a central aperture in the bottom for the admission of the pipe 9 and another aperture connecting with the pipe 11. This pan is so spaced from the trough 8 that there is provided a barrier which ordinarily prevents the fowl from approaching the drinking trough and requires the fowl to stand on the platform 13 as shown in Figure 1, outside the barrier. This pan receives all of the water scattered while the poultry are drinking, and this water as well as the overflow is carried out through the drain pipe 11.

It is noted from an observation of Figure 1 that the platform 13 is elevated an appreciable distance. This may be 1½ or preferably 2 feet above the floor of the poultry house. The advantage of having an elevated platform is that the poultry are required to fly up whenever they want a drink and when flying dirt which may adhere to the feathers or legs is dropped from the poultry and therefore they come to the drinking trough in a cleaner condition than if the drinking trough were placed on a level with the floor.

The nozzle 2 as shown in Figure 1 is of very thin metal so that if a bit of straw or grain should rest on the top and temporarily check the flow of water through the nozzle it might be very easily cleaned without any danger of clogging the aperture.

It is apparent from the foregoing specific description that I have invented a very novel, and useful device for use in poultry houses which is simple and cheaply manufactured, which is easily assembled and put in place, and which is capable of giving satisfactory service at all times to provide clean, fresh drinking water with practically no danger of freezing or getting out of repair. Furthermore it is clear than a unique device has been provided for facilitating the prevention of disease and the scattering of water about the poultry house and that this device facilitates the keeping clean of the poultry house.

It is clear also that many changes may be made by those skilled in the art without departing from the spirit of the invention and it is distinctly understood that I do not limit myself except as in appended claims.

I claim:

1. A sanitary device for furnishing drinking water to poultry, comprising in combination, a drinking trough, a spout provided with a nozzle located within the confines of the trough just below the water level and arranged to project a stream of water upwardly thereby agitating the body of water, and a canopy spaced above the nozzle to intercept the stream of water and cause it to be returned in sprayed condition to the drinking trough.

2. A sanitary device for furnishing drinking water to poultry comprising in combination, a drinking trough, a spout provided with a nozzle having a small upwardly directed aperture located just below the water level in the trough so that a stream of water is projected upwardly, a canopy so positioned as to intercept the jet of water and cause it to be returned to the drinking trough, and the trough edge being so arranged that water overflows therefrom uniformly.

3. A sanitary device for furnishing drinking water to poultry comprising in combination, a drinking trough, a spout mounted in the trough provided with a nozzle having a small aperture adapted to project a jet of water upwardly, the water in said trough overflowing the edge uniformly, said nozzle being mounted slightly beneath the level of said edge, a canopy mounted over the nozzle and adapted to intercept the jet of water from said nozzle and to return the water to the trough, and a bracket carried by the spout and adapted to support said canopy.

4. A sanitary device for furnishing drinking water to poultry, comprising in combination, a trough, a spout mounted in the trough, said spout having a nozzle which is provided with a small aperture adapted to project a stream of water vertically upward, the water in said trough overflowing the edge uniformly, said nozzle being positioned below the level of said edge whereby, in the normal condition of use a jet of water is constantly flowing through some of the water, whereby the water in the drinking trough is kept in a constant commotion, and a canopy so mounted above the nozzle that water from the jet drops back upon the surface of the water which is kept in a constant commotion so that the formation of ice in the trough is prevented.

Signed at New York in the county of New York, and State of New York, this 24th day of February, 1921.

WILLIAM HEGEL. [L. S.]